(12) United States Patent
Bossard

(10) Patent No.: US 7,771,520 B1
(45) Date of Patent: Aug. 10, 2010

(54) SYSTEM AND METHOD FOR FORMING A MEMBRANE THAT IS SUPER-PERMEABLE TO HYDROGEN

(76) Inventor: Peter R. Bossard, 106 Railroad Dr., Ivyland, PA (US) 18974

( * ) Notice: Subject to any disclaimer, the term of this patent is extended or adjusted under 35 U.S.C. 154(b) by 643 days.

(21) Appl. No.: 11/705,631

(22) Filed: Feb. 14, 2007

Related U.S. Application Data

(60) Provisional application No. 60/842,519, filed on Sep. 6, 2006.

(51) Int. Cl.
 *B01D 53/22* (2006.01)
(52) U.S. Cl. .................... 96/11; 96/4; 96/8; 96/10; 95/45; 95/55; 95/56; 55/523; 55/524; 55/DIG. 5; 423/644; 423/648.1
(58) Field of Classification Search .............. 96/4, 96/8, 10, 11; 95/45, 55, 56, 901, 903; 55/523, 55/524, DIG. 5; 423/644, 648.1
 See application file for complete search history.

(56) References Cited

U.S. PATENT DOCUMENTS

| 5,215,729 | A  | * | 6/1993  | Buxbaum     | 95/56 |
|-----------|----|---|---------|-------------|-------|
| 5,259,870 | A  | * | 11/1993 | Edlund      | 95/56 |
| 6,214,090 | B1 | * | 4/2001  | Dye et al.  | 95/56 |
| 6,235,417 | B1 | * | 5/2001  | Wachsman et al. | 95/56 |
| 6,340,379 | B1 | * | 1/2002  | Penth et al.| 95/45 |
| 6,649,559 | B2 | * | 11/2003 | Drost et al.| 95/56 |
| 6,761,755 | B2 | * | 7/2004  | Jantsch et al. | 96/11 |
| 7,018,446 | B2 | * | 3/2006  | Alvin et al.| 95/56 |
| 7,524,361 | B2 | * | 4/2009  | Park et al. | 96/4  |
| 2004/0129135 | A1 | * | 7/2004  | Roark et al. | 95/55 |
| 2004/0244589 | A1 | * | 12/2004 | Bossard et al. | 96/11 |
| 2005/0011359 | A1 | * | 1/2005  | Pan et al. | 96/10 |
| 2008/0282882 | A1 | * | 11/2008 | Saukaitis et al. | 95/56 |

OTHER PUBLICATIONS

Zhao, Hongbin et al., "Preparation and Characterization of Novel Porous Metal/Ceramic Catalytic Membrane Materials", 1995, Catalysis Today, vol. 25, pp. 237-240.*

* cited by examiner

*Primary Examiner*—Jason M Greene
(74) *Attorney, Agent, or Firm*—LaMorte & Associates

(57) ABSTRACT

A hydrogen separation membrane and its associated method of fabrication. The hydrogen separation membrane has a first material layer that is permeable to atomic hydrogen. The first material has a first catalytic ability to disassociate molecular hydrogen into atomic hydrogen. Complex particles are applied to the first material layer, either to produce a second layer or to act as a barrier between the first layer and a subsequent layer. The complex particles are hollow bucky structure, filled bucky structures or core particles coated with a hydrogen permeable metal. The complex particles prevent material from opposite sides of the hydrogen separation membrane from interdiffusing over time. Consequently, palladium based materials and Group V based materials can be used on opposite sides of the hydrogen separation membrane. This produces a hydrogen separation membrane that is more permeable to hydrogen in one direction than it is in the opposite direction.

19 Claims, 5 Drawing Sheets

SYSTEM AND METHOD FOR FORMING A MEMBRANE THAT IS SUPER-PERMEABLE TO HYDROGEN

RELATED APPLICATIONS

This application claims priority of provisional patent application No. 60/842,519, filed Sep. 6, 2006, entitled System And Method For Forming A Membrane That Is Super-Permeable To Hydrogen.

BACKGROUND OF THE INVENTION

1. Field of the Invention

In general, the present invention relates to a new generation of hydrogen permeable membranes that can be used to separate pure hydrogen from mixed gas sources. More particularly, the present invention relates to the physical structure of such hydrogen permeable membranes.

2. Prior Art Description

In the industry, there are many applications for the use of molecular hydrogen. However, in many common processes that produce hydrogen, the hydrogen gas produced is not pure. Rather, when hydrogen is produced, the resultant gas is often contaminated with water vapor, carbon monoxide, hydrocarbons and/or other contaminants. In many instances, such as fueling a proton exchange fuel cell, it is necessary to have ultra pure hydrogen. In the art, ultra pure hydrogen is commonly considered to be hydrogen having purity levels of at least 99.999%. In order to achieve such purity levels, hydrogen gas must be actively separated from its contaminants.

In the prior art, one of the most common ways to purify contaminated hydrogen gas is to pass the gas through a pressure swing absorption system that effectively absorbs most of the contaminating gases and lets the hydrogen gas pass through with only a small pressure drop. This is an energy inefficient technology that operates best in large plant operations.

When hydrogen gas is purified to an ultra pure state, it is passed through a membrane of hydrogen permeable material, such as palladium or a palladium alloy. In order for hydrogen to permeate through a palladium-based membrane at a practical rate, there must be enough thermal energy present to disassociate molecular hydrogen in the presence of palladium into atomic hydrogen on the surface of the membrane. The palladium-based membrane then absorbs the atomic hydrogen into its interior volume. The atomic hydrogen permeates through the membrane from a high pressure side of the membrane to a low pressure side of the membrane. Once at the low pressure side of the membrane, the atomic hydrogen recombines to form molecular hydrogen which can either leave the surface of the membrane or again disassociate into two hydrogen atoms, either of which or both may be reabsorbed into the bulk of the membrane material. Once in the bulk of the membrane material, the hydrogen atom can emerge from the bulk on either side of the membrane. The direction of the net hydrogen ($H_2$) gas flow after separation and recombination is determined by which side of the membrane has more hydrogen atoms dropping into the bulk. For a palladium membrane whose surface is the same on both sides, the number of hydrogen atoms that split and drop into the bulk is predominately determined by the pressure of the hydrogen gas. Consequently, in order to maintain a flow of purified hydrogen, a pressure differential must be maintained between the two sides of the membrane. The purified side of the membrane is kept at a lower pressure than the contaminated side of the membrane. This ensures that hydrogen gas has a bias that moves it through the membrane. Relying upon a pressure differential to move hydrogen through a membrane has many limitations that detract from both the efficiency and running life of prior art hydrogen separators.

One way to improve a hydrogen permeable membrane would be to make the contaminated gas side of the membrane more reactive to splitting the hydrogen gas molecule than the pure hydrogen gas side. In this manner, the combination of the two membrane surfaces would act as a one-way valve, thereby reducing the need for a differential hydrogen pressure to prevent backward hydrogen flow. The net flow of hydrogen gas depends only on the difference in the catalytic ability of the opposite sides of the membrane to split the hydrogen molecule.

Attempts have been made to produce membranes having opposing sides that embody different hydrogen molecule disassociation characteristics. Many of these attempts include producing membranes from layers of different hydrogen permeable materials. Unsuccessful attempts included forming membranes where the contaminated gas side of the membrane is made from a palladium alloy, and the opposite side of the membrane is made from niobium or tantalum. In theory, such multilayer membranes were expected to work. Palladium is a catalyst that promotes the splitting of hydrogen molecules ($H_2$) into two atoms of hydrogen (H+H). Metals, such as niobium, tantalum and vanadium are permeable to atomic hydrogen but are not effective catalysts for disassociating molecular hydrogen into atomic hydrogen. Thus, hydrogen gas would dissociate into atomic hydrogen as it contacted the palladium alloy on the contaminated side of the membrane. The atomic hydrogen would pass through the membrane and would immediately recombine into molecular hydrogen once out of the membrane on the opposite side. In a reverse flow situation, molecular hydrogen would contact the niobium or tantalum layer. Since these metals do not promote the disassociation of molecular hydrogen into atomic hydrogen, the molecular hydrogen remains as molecular hydrogen. The molecular hydrogen therefore would not be able to pass into the structure of the membrane. Consequently, hydrogen flows far more efficiently from the palladium layer to the niobium/tantalum layer than in reverse.

Although such membranes were good in theory, they did not work in reality. Hydrogen separation membranes operate at high temperatures. Once a palladium membrane was coated with niobium or tantalum, the atoms of niobium/tantalum migrate into the palladium. At the high operating temperatures of a hydrogen separator, the niobium/tantalum atoms diffuse into the palladium atoms, eventually creating a homogenous alloy. Once the niobium and tantalum atoms are dispersed in the palladium, the benefits of a separate niobium/tantalum layer are lost.

The problem of metal atom diffusion has been addressed by coating opposite sides of a neutral porous substrate with palladium and niobium or tantalum. However, the porous substrate significantly detracts from the ability of hydrogen to efficiently pass through the membrane. Furthermore, due to differences in thermal expansion between the hydrogen permeable metals and the substrate, membranes with substrates tend to have shortened operational lives.

A need therefore exists for a way to create a hydrogen permeable membrane using different hydrogen permeable metals without a substrate and without having the hydrogen permeable metals interdiffuse. This need is met by the present invention as described and claimed below.

SUMMARY OF THE INVENTION

The present invention is a hydrogen separation membrane and the associated method of fabricating a hydrogen separation membrane. The hydrogen separation membrane has a first material layer that is permeable to atomic hydrogen. The first material has a first catalytic ability to disassociate molecular hydrogen into atomic hydrogen. Complex particles are applied to the first material layer, either to produce a second layer or to act as a barrier between the first layer and a subsequent layer. The complex particles are selected from a group consisting of hollow buckyballs, filled buckyballs, hollow buckytubes, filled bucky tubes and core particles coated with a hydrogen permeable metal. The complex particles prevent material from opposite sides of the hydrogen separation membrane from interdiffusing over time. Consequently, palladium based materials and Group V based materials can be used on opposite sides of the hydrogen separation membrane. This produces a hydrogen separation membrane that is more permeable to hydrogen in one direction than it is in the opposite direction.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
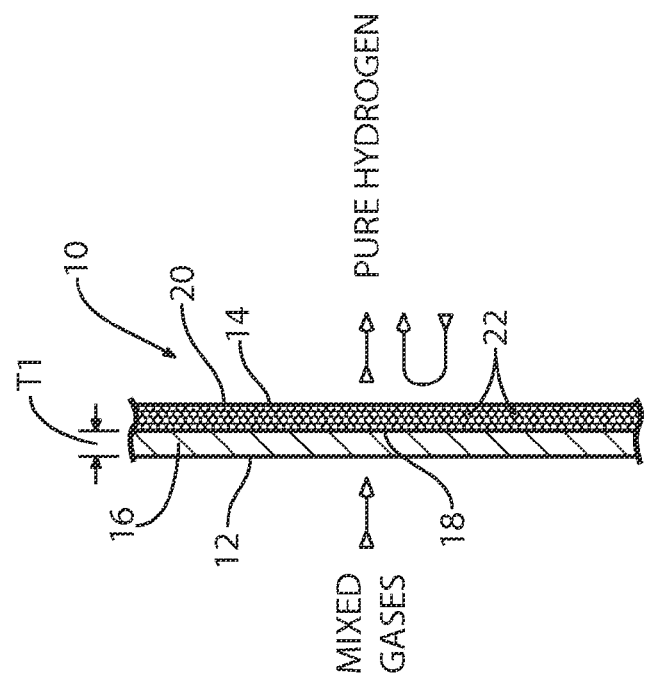
FIG. 1 is a fragmented view of a section of a hydrogen permeable membrane.

Referring to FIG. 1, there is shown a segment of a membrane wall 10. The membrane wall 10 is used in a hydrogen separator, wherein a first side 12 of the membrane wall 10 is exposed to a first chamber 13 of mixed gases from which hydrogen is to be separated. Hydrogen passes through the membrane wall 10 so that the second side 14 of the membrane wall 10 is exposed to a second chamber 15 that contains only pure hydrogen.

The first side 12 of the membrane wall 10 is preferably made from a layer of palladium or a palladium alloy, such as a palladium-silver alloy. The palladium alloy layer 16 is present in a first thickness T1. The thickness T1 of the palladium alloy layer 16 depends upon the structure and operating parameters of the hydrogen separator in which the membrane wall 10 is used.

The palladium alloy layer 16 has an interface surface 18 that faces the second side 14 of the membrane wall 10. The second side 14 of the palladium alloy layer 16 is coated with complex particles 22 in a particle layer 20. The complex particles 22 contain a Group V hydrogen permeable metal, such as vanadium, niobium or tantalum. As will also be explained, each complex particle 22 has a structure too complex to diffuse into the material of the palladium alloy layer 16. Accordingly, the palladium alloy layer 16 and the Group V metals in the particle layer 20 remain separated throughout the operating life of the membrane wall 10.

Figure 2:
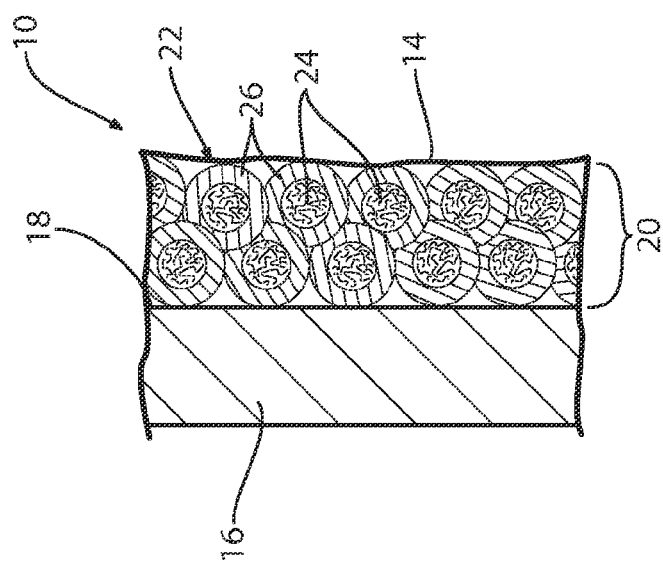
FIG. 2 is an enlarged view of a segment of the hydrogen permeable membrane shown in FIG. 1.

Referring to FIG. 2, a first type of complex particle 22 is shown. In this embodiment, the complex particles 22 include cores 24 of an inert material having a coating 26 of a Group V metal (niobium, tantalum, vanadium and/or their alloys). The inert core 24 is preferably ceramic. However, cores of non-reactive metals, such as stainless steel, can also be used. The inert cores 24 preferably have a size of between 10 and 50 nanometers. The thickness of the coatings 26 on the inert cores 24 are preferably between 30 nanometers and 150 nanometers.

The complex particles 22 are bonded to an interface surface 18 of the palladium alloy layer 16. The complex particles 22 are applied densely so as to create a solid particle layer 20. Since the complex particles 22 are large and have inert cores 24, they cannot diffuse into the palladium alloy layer 16 and remain in a separate particle layer 20. This separate particle layer 20 is maintained even over long periods of time at high operational temperatures.

In operation, it will be understood that the first side 12 of the palladium alloy layer 16 is exposed to mixed gases that contain hydrogen. Hydrogen that contacts the palladium alloy layer 16 disassociates into atomic hydrogen and passes through the palladium alloy layer 16. The atomic hydrogen is passed into the particle layer 20 wherein the atomic hydrogen passes through the coatings 26 of the complex particles 22. As the atomic hydrogen exits the particle layer 20 and becomes free of the membrane wall 10, the atomic hydrogen reassociates into molecular hydrogen.

Should a molecule of hydrogen flow against the membrane wall 10 in the opposite direction, the molecular hydrogen will not pass into the particle layer 20 unless it disassociates into atomic hydrogen first. Although there may be enough thermal energy for sporadic disassociation to occur, the niobium, tantalum and/or vanadium material within the particle layer 20 is not an effective catalyst to hydrogen molecule disassociation. The vast majority of the hydrogen molecules therefore remain in the lower energy state. Any hydrogen molecule that does not disassociate into atomic hydrogen cannot pass into the particle layer 20. The result is that hydrogen cannot readily flow backward through the membrane wall 10. It will therefore be understood that the membrane wall 10 is far more permeable to hydrogen in one direction than it is in the other.

Figure 3:
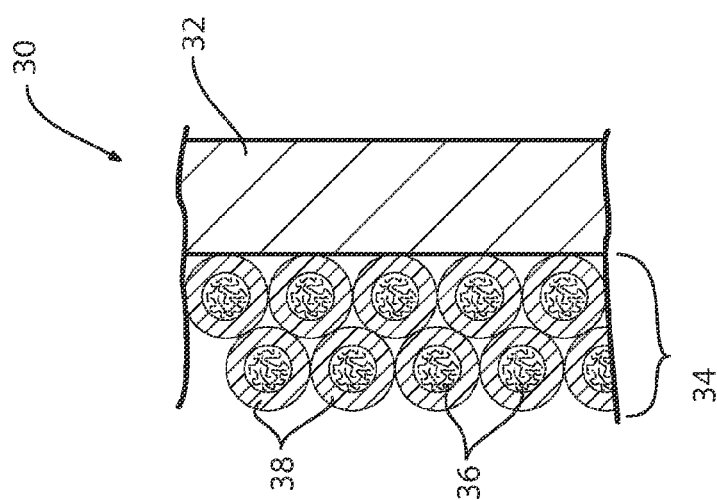
FIG. 3 shows an alternate embodiment for the construction of the hydrogen permeable membrane.

In the embodiment of FIG. 2, the palladium based layer 16 is solid and the niobium, tantalum, and/or vanadium material is contained in the particle layer 20. Such a configuration can be reversed while maintaining the same functionality and effect. Referring to FIG. 3, an alternate embodiment of the membrane wall 30 is shown. In this embodiment, a solid layer 32 of a Group V metal or metal alloy is provided. The solid layer 32 is coated with a particle layer 34. The particle layer 34 is comprised of an inert core 36 having a coating 38 of palladium or a palladium alloy.

In this embodiment, the particle layer 34 is exposed to the mixed gases. Hydrogen gas from the mixed gases disassociates into atomic hydrogen and pass into the palladium alloy coatings 38 in the particle layer 34. The atomic hydrogen passes through the solid layer 32 and reassociates into molecular hydrogen as it exits the solid layer 32. Reverse flow from the niobium/tantalum/vanadium back into the palladium alloy is diminished for the reasons previously explained while referencing the embodiment of FIG. 2.

The complex particle configuration of the palladium alloy coated particles keeps them from diffusing with the Group V metal of the solid layer 32. This ensures that the palladium alloy does not diffuse into the Group V metal and vice versa.

Figure 4:
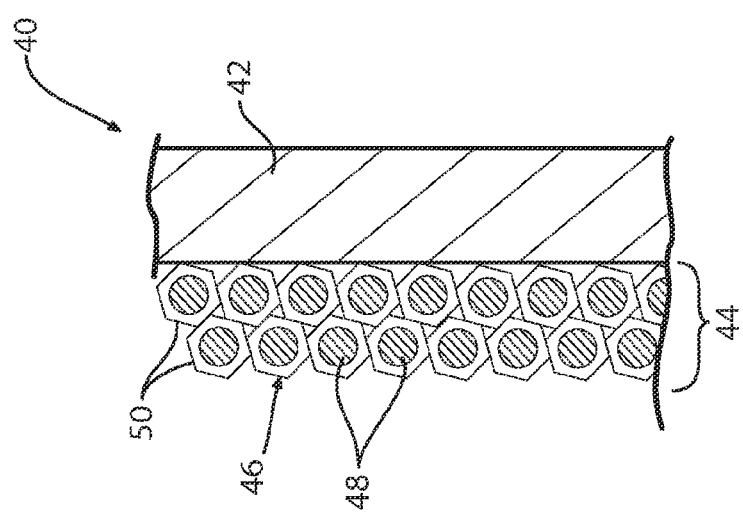
FIG. 4 shows an alternate embodiment for the construction of the hydrogen permeable membrane that uses buckyballs.

Referring to FIG. 4, another alternate embodiment of the membrane wall 40 is shown. Again, the membrane wall 40 has a solid layer 42 and a particle layer 44. Again, one layer is a palladium alloy and the other layer is niobium, tantalum, vanadium and/or their alloys. In this embodiment, the complex particles 46 within the particle layer 44 include buckyballs and/or buckytubes that are filled with hydrogen permeable material.

Buckyball is the common name for a hollow spherical structure of carbon atoms. The carbon atoms are arranged in interconnecting pentagons and hexagons, like the pattern of a soccer ball. A typical buckyball is comprised of sixty carbon atoms. However, buckyballs with less carbon atoms do exist. A buckytube is a cylindrical structure made from carbon atoms and amounts to a chain of incomplete buckyballs that have bonded together. Both buckyballs and buckytubes can be commercially purchased in bulk. By bombarding a buckyball or buckytube with a high velocity stream of palladium, niobium, tantalum or vanadium, atoms of these hydrogen permeable materials can be placed inside the structure of the buckyball or buckytube. As an example, approximately thirty palladium atoms can fit inside a sixty carbon atom buckyball.

In FIG. 4, atoms of palladium alloy 48 are captured within buckyballs 50. Although only buckyballs 50 are shown it will be understood that buckytubes (not shown) can be substituted for the buckyballs. The resulting complex particles 46 are hydrogen permeable. The openings in a buckyball 50 are much larger than hydrogen molecules. Thus, hydrogen gas can pass into a buckyball 50 and interact with the palladium alloy 48.

Once the buckyballs 50 are filled with palladium alloy 48, the resulting complex particles 46 can then be used to coat a solid layer 42 of niobium, tantalum, or vanadium. The complex particles 46 are too large to diffuse into the solid layer 42. Consequently, the particle layer 44 and the solid layer 42 remain separate and do not interdiffuse. This produces a membrane wall 40 with separate layers for palladium alloy 48 and the Group V metal.

It will be understood that the construction can be reversed and atoms of niobium, tantalum and/or vanadium can be placed inside buckyballs/buckytubes to produce complex hydrogen permeable particles. These hydrogen permeable particles can then be used to coat a solid layer of palladium alloy.

Regardless of the configuration that is used, it will be understood that the present invention is a membrane wall made with a first layer of palladium or a palladium alloy and a second layer of niobium, tantalum, vanadium or their alloys. The two layers are prevented from interdiffusing by creating one of the layers into particles that are too complex to diffuse. The particles are either nano-particles covered with a selected hydrogen permeable material or a buckyball filled with hydrogen permeable material.

Figure 5:
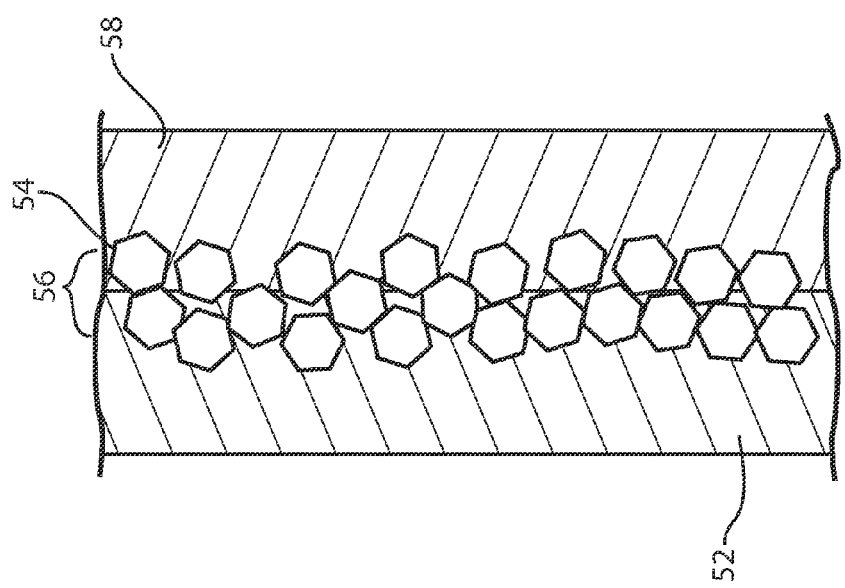
FIG. 5 shows an alternate embodiment for the construction of the hydrogen permeable membrane that uses a reinforcement layer of buckyballs.

In the embodiment of FIG. 4, the buckyballs 50 are filled with palladium, niobium, tantalum or vanadium prior to being applied to the structure of the membrane. Referring to FIG. 5, an alternate technique is used. In FIG. 5, a solid layer of a palladium alloy 52 is provided. One surface of the palladium alloy layer 52 is bombarded with high velocity buckyballs 54 that are empty. Again, it will be understood that buckytubes can be substituted for the buckyballs 54. A buckyball layer 56 is produced. The buckyball layer 56 is partially embedded into the palladium alloy layer 52.

A solid layer 58 of pure or alloyed niobium, tantalum, and/or vanadium is deposited over the buckyball layer 56. The buckyball layer 56 acts as a barrier layer that prevents intermigration of the palladium alloy layer 52 and the solid layer 58 of niobium, tantalum and/or vanadium. However, due to the structure of the buckyballs 54, the buckyball layer 56 remains highly pervious to atomic hydrogen. Atomic hydrogen can therefore freely pass through the membrane structure.

It will be understood that the buckyball layer 56 can be deposited into the solid layer 58 of niobium, tantalum and/or vanadium rather than the palladium alloy layer 52 and the same effect will be produced.

In the embodiment of FIG. 5, buckyballs 54 are used to create a barrier between a solid layer of palladium/palladium alloy and a solid layer of a Group V metal or alloy. It will be understood that any of the complex particles previously described can also be used as a barrier between solid layers of palladium and Group V metals. The membrane wall would therefore have three layers, namely a palladium based layer, a Group V metal based layer and an intervening barrier layer of complex particles. The complex particles can be hollow buckyballs, filled buckyballs, hollow buckytubes, filled buckytubes and/or inert cores coated with hydrogen permeable material.

It will be understood that the embodiments of the present invention that have been illustrated are merely exemplary and that a person skilled in the art can make variations to the shown embodiments without departing from the scope of the invention. For instance, in the shown embodiments a particle layer is deposited directly upon a solid layer. It will be understood that an additional layer, such as a bonding layer can be used to help the particles adhere to the solid layer, provided the additional layer is highly permeable to hydrogen. All such variations, modifications and alternate embodiments are intended to be included within the scope of the present invention.

What is claimed is:

1. A separation membrane for separating pure hydrogen gas from a mixed gas at a predetermined operating temperature, said separation membrane comprising:

a first layer of a palladium alloy that is permeable to atomic hydrogen at said operating temperature, said first layer having a first exposed surface, wherein said first layer has a first catalytic ability to disassociate molecular hydrogen into atomic hydrogen at said first exposed surface;

a second layer containing complex particles, wherein said complex particles have both hydrogen impermeable material and hydrogen permeable metal that is permeable to atomic hydrogen at said operating temperature, said hydrogen permeable metal being selected from a group consisting of vanadium, niobium, tantalum, and alloys thereof, said second layer having a second exposed surface, wherein said second layer of material has a second catalytic ability to disassociate molecular hydrogen into atomic hydrogen at said second exposed surface.

2. The membrane according to claim 1, wherein said first catalytic ability to dissociate molecular hydrogen into atomic hydrogen is greater than said second catalytic ability.

3. The membrane according to claim 1, wherein said complex particles contain inert cores that are at least partially coated with said hydrogen permeable metal.

4. The membrane according to claim 1, wherein said complex particles contain carbon bucky structures that are at least partially filled with said hydrogen permeable metal.

5. A separation membrane for separating pure hydrogen gas from a mixed gas at a predetermined operating temperature, said separation membrane comprising:
   a first layer of a palladium alloy that is permeable to atomic hydrogen at said operating temperature, said first layer having a first exposed surface, wherein said first material has a first catalytic ability to disassociate molecular hydrogen into atomic hydrogen at said first exposed surface;
   a second layer of a hydrogen permeable metal that is permeable to atomic hydrogen at said operating temperature, said hydrogen permeable metal being selected from a group consisting of vanadium, niobium, tantalum, and alloys thereof, said second layer having a second exposed surface, wherein said second layer is affixed to said first layer along an interface, and wherein said second layer has a second catalytic ability to disassociate molecular hydrogen into atomic hydrogen at said second exposed surface; and
   complex particles present proximate said interface that inhibit interdiffusion between said palladium alloy and said hydrogen permeable metal over time.

6. The separation membrane according to claim 5, wherein said first catalytic ability to dissociate molecular hydrogen into atomic hydrogen is at least twice as great as said second catalytic ability at said operating temperature.

7. The separation membrane according to claim 5, wherein said complex particles are particles having an inert core coated with said hydrogen permeable metal.

8. The separation membrane according to claim 5, wherein said complex particles are hollow carbon structures that are filled with said hydrogen permeable metal.

9. A method of fabricating a hydrogen separation membrane, comprising the steps of:
   providing a palladium alloy layer that is permeable to atomic hydrogen, wherein said palladium alloy layer has a first catalytic ability to disassociate molecular hydrogen into atomic hydrogen;
   applying a complex particle layer to said palladium alloy layer, wherein said complex particle layer has particles containing both hydrogen impermeable material and a hydrogen permeable metal selected from a group consisting of vanadium, niobium, tantalum and alloys thereof, and wherein said complex particle layer is permeable to atomic hydrogen and has a second catalytic ability to disassociate molecular hydrogen into atomic hydrogen;
   wherein said hydrogen impermeable material in each of said particles inhibits intermigration of said hydrogen permeable layer and said hydrogen permeable metal over time.

10. The method according to claim 9, wherein said hydrogen impermeable material in each of said particles is selected from a group consisting of stainless steel, ceramics, carbon buckytubes and carbon buckyballs.

11. The method according to claim 9, wherein each of said particles includes an inert core coated with said hydrogen permeable metal.

12. The method according to claim 9, wherein said particles include an inert shell filled with said hydrogen permeable metal.

13. The method according to claim 9, wherein said first catalytic ability to disassociate molecular hydrogen is at least twice as great as said second catalytic ability.

14. A method of fabricating a hydrogen separation membrane, comprising the steps of:
   providing a first material layer that is permeable to atomic hydrogen, wherein said first material has a first catalytic ability to disassociate molecular hydrogen into atomic hydrogen;
   applying particles to said first material layer, wherein said particles are filled with a hydrogen permeable metal;
   applying a second material layer over said particles, wherein said second material layer is permeable to atomic hydrogen and has a second catalytic ability to disassociate molecular hydrogen into atomic hydrogen;
   wherein said particles inhibit intermigration of said first material layer and said second material layer over time.

15. The method according to claim 14, wherein said particles are selected from a group consisting of stainless steel particles, ceramic particles, carbon buckytubes and carbon buckyballs.

16. The method according to claim 14, wherein said particles are coated with a hydrogen permeable metal.

17. The method according to claim 14, wherein said first catalytic ability to disassociate molecular hydrogen is at least twice as great as said second catalytic ability.

18. The method according to claim 14, wherein said second catalytic ability to disassociate molecular hydrogen is at least twice as great as said first catalytic ability.

19. The method according to claim 14, wherein said first material layer and said second material layer are dissimilar layers, containing different hydrogen permeable metals.

* * * * *